(12) United States Patent  
Gerdes et al.

(10) Patent No.: US 7,334,510 B2
(45) Date of Patent: Feb. 26, 2008

(54) VEHICLE BRAKE LATHE WITH VARIABLE SPEED MOTOR

(75) Inventors: Michael D. Gerdes, St. Peters, MO (US); Michael A. Olsen, Lake St. Louis, MO (US); Nicholas J. Colarelli, III, St. Louis, MO (US); Alberto Caorle, Marano Vicentino (IT)

(73) Assignee: Hunter Engineering Company, Bridgeton, MO (US)

( * ) Notice: Subject to any disclaimer, the term of this patent is extended or adjusted under 35 U.S.C. 154(b) by 382 days.

(21) Appl. No.: 10/898,115

(22) Filed: Jul. 23, 2004

(65) Prior Publication Data

US 2005/0022639 A1 Feb. 3, 2005

Related U.S. Application Data

(60) Provisional application No. 60/489,639, filed on Jul. 24, 2003.

(51) Int. Cl.
*B23B 3/22* (2006.01)

(52) U.S. Cl. .......................................... 82/112; 82/1.11
(58) Field of Classification Search ................. 82/112, 82/1.11; 451/424; 29/802
See application file for complete search history.

(56) References Cited

U.S. PATENT DOCUMENTS

| | | | |
|---|---|---|---|
| 5,347,895 A * | 9/1994 | Bellinghausen et al. ...... 82/112 |
| 6,233,533 B1 * | 5/2001 | Xu et al. ...................... 702/91 |
| 6,324,908 B1 | 12/2001 | Colarelli, III et al. |
| 6,363,821 B1 * | 4/2002 | Greenwald et al. .......... 82/1.11 |
| 6,386,031 B2 | 5/2002 | Colarelli, III et al. |

* cited by examiner

*Primary Examiner*—Willmon Fridie, Jr.
(74) *Attorney, Agent, or Firm*—Polster, Lieder, Woodruff & Lucchesi, L.C.

(57) ABSTRACT

The present invention relates to on-car brake lathes configured for resurfacing brake rotor components, and in particular, to improved on-car brake lathes configured with a controlled variable speed drive system.

28 Claims, 7 Drawing Sheets

VEHICLE BRAKE LATHE WITH VARIABLE SPEED MOTOR

CROSS-REFERENCE TO RELATED APPLICATIONS

This application is related to, and claims priority from, U.S. Provisional Patent Application Ser. No. 60/489,639 filed on Jul. 24, 2003, and herein incorporated by reference.

STATEMENT REGARDING FEDERALLY SPONSORED RESEARCH

Not Applicable.

BACKGROUND OF THE INVENTION

The present invention relates to automotive vehicle brake lathes configured for resurfacing brake rotor components, and in particular to vehicle brake lathes utilizing variable speed drive motors.

One of the main components of a vehicle wheel braking system employing disk brakes are the brake disks, or brake rotors, which provide a solid rotating surface against which the stationary brake friction pads are clamped or compressed to generate a frictional force, slowing the rotational movement of the brake disks or brake rotors and the associated vehicle wheels. The brake disks or brake rotors are subjected to repeated and substantial frictional forces by the brake friction pads, and over time, become worn. Uneven application of braking force, debris, or uneven frictional surfaces on the brake friction pads can result in the formation of grooves, channels, or scratches in the surfaces of the brake disks or brake rotors. Repeated heating and cooling of the brake disk or brake rotor resulting in extreme temperature variations can additionally result in the lateral warping of the brake disk or brake rotor.

A worn or warped brake disk or brake rotor may be resurfaced by cutting or grinding to provide a uniform smooth brake friction pad contact surface if sufficient brake disk or brake rotor material remains to provide an adequate braking surface without compromising the structural integrity of the vehicle braking system. However, once a brake disk or brake rotor has been worn below a minimum safe thickness, it is unable to safely dissipate the heat generated by a brake application, and must be replaced.

To provide for a uniform surface, any abnormalities in the brake disk or brake rotor, such as a lateral warping must be detected and removed during the resurfacing procedures. An additional source of lateral warping defects in a brake rotor or brake disk is often over tightened attachment bolts or an uneven mounting surface onto which the brake disk or brake rotor is secured in the vehicle wheel assembly. If the brake disk or brake rotor is removed from the vehicle wheel assembly for a resurfacing operation on a fixed or "bench" brake lathe any abnormalities or defects resulting from the mounting of the brake disk or brake rotor to the vehicle wheel assembly may not be accurately identified or corrected during the resurfacing procedure. Accordingly, a variety of brake resurfacing machines or brake lathes have been developed to resurface brake disks and brake rotors while they remain mounted to the vehicle wheel assembly.

Brake resurfacing machines or brake lathes configured to resurface brake disks and brake rotors mounted to a vehicle wheel assembly are commonly referred to as on-car brake lathes. One example of an on-car brake lathe is the OCL-360 brake lathe sold by Hunter Engineering Co. of Bridgeton, Mo. By eliminating the need to remove the brake disk or brake rotor from the vehicle wheel assembly, the overall efficiency of the resurfacing procedure is improved, and the chances for operator induced error are reduced.

Traditionally, on-car and bench brake lathes, such as the BL501/BL505 off-car brake lathe sold by Hunter Engineering Co. of Bridgeton, Mo., utilize motors or drive systems configured for operation at a fixed spindle RPM and feed rate. During rotor cutting or resurfacing, a resonance or vibration, commonly referred to as "chatter", can develop between the rotor cutting tools and the rotor surface, resulting at best in an uneven resurfacing of the brake rotor, or at worst, in severe damage to the rotor surface or rotor cutting tools themselves. Accordingly, the fixed spindle RPM and feed rates in traditional on-car and bench brake lathes are selected to be below the rates at which the resonance or vibration is likely to occur. However, since the rates at which the resonance or vibration are likely to occur vary for different types of brake rotors, there is a need for on-car and bench brake lathes having improved drive motor systems, which are capable of varying the spindle RPM during the resurfacing of a rotor and, optionally, the feed rate, up to a maximum rate at which a desired brake rotor resurfacing quality can be achieved, thereby reducing operator time require to resurface a brake rotor and providing enhanced safety features, such as automatic motor speed reduction or shutoff during abnormal operating conditions.

Some vehicles are equipped with locking differentials in the vehicle drive train that engage when a difference in wheel rotational speed from one side of the vehicle to the other reaches approximately 100 RPM. When the locking mechanism engages, as may occur during rotation of a brake rotor by an on-car brake lathe, the resulting change in rotational resistance can violently rotate the entire on-car lathe body. It is desirable to provide an on-car brake lathe with safety features configured to automatically stop the lathe rotation if a sudden resistance is encountered in the cut.

BRIEF SUMMARY OF THE INVENTION

Briefly stated, the present invention is an improved brake lathe system for the resurfacing of vehicle brake rotors. The improved brake lathe system is configured with a variable speed drive system and controller for regulating the rotor cutting rate.

In an alternate embodiment, a brake lathe of the present invention incorporates a variable speed spindle motor as a drive system. The variable speed spindle motor may be a direct current motor with a pulse width modulation controller or an SCR controller, or an AC motor with a vector drive, inverter drive, or a Volts/Hertz drive. The variable speed spindle motor is configured to drive the output spindle at a variable RPM and may optionally provide a variable linear feed rates for the cutting head when resurfacing a brake rotor.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
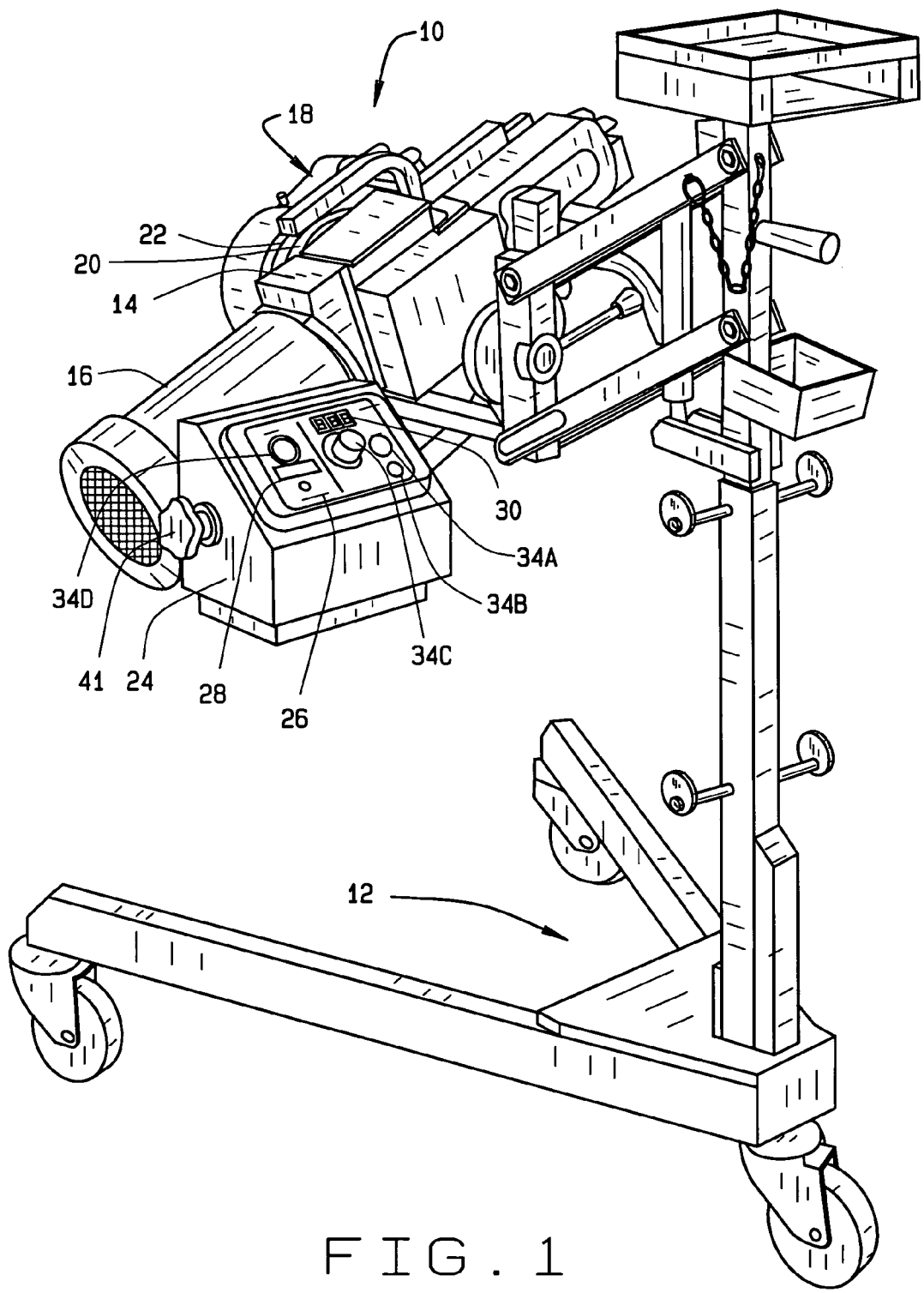
FIG. 1 is a perspective view of an on-car vehicle brake lathe secured to a transport trolley.
Figure 2:
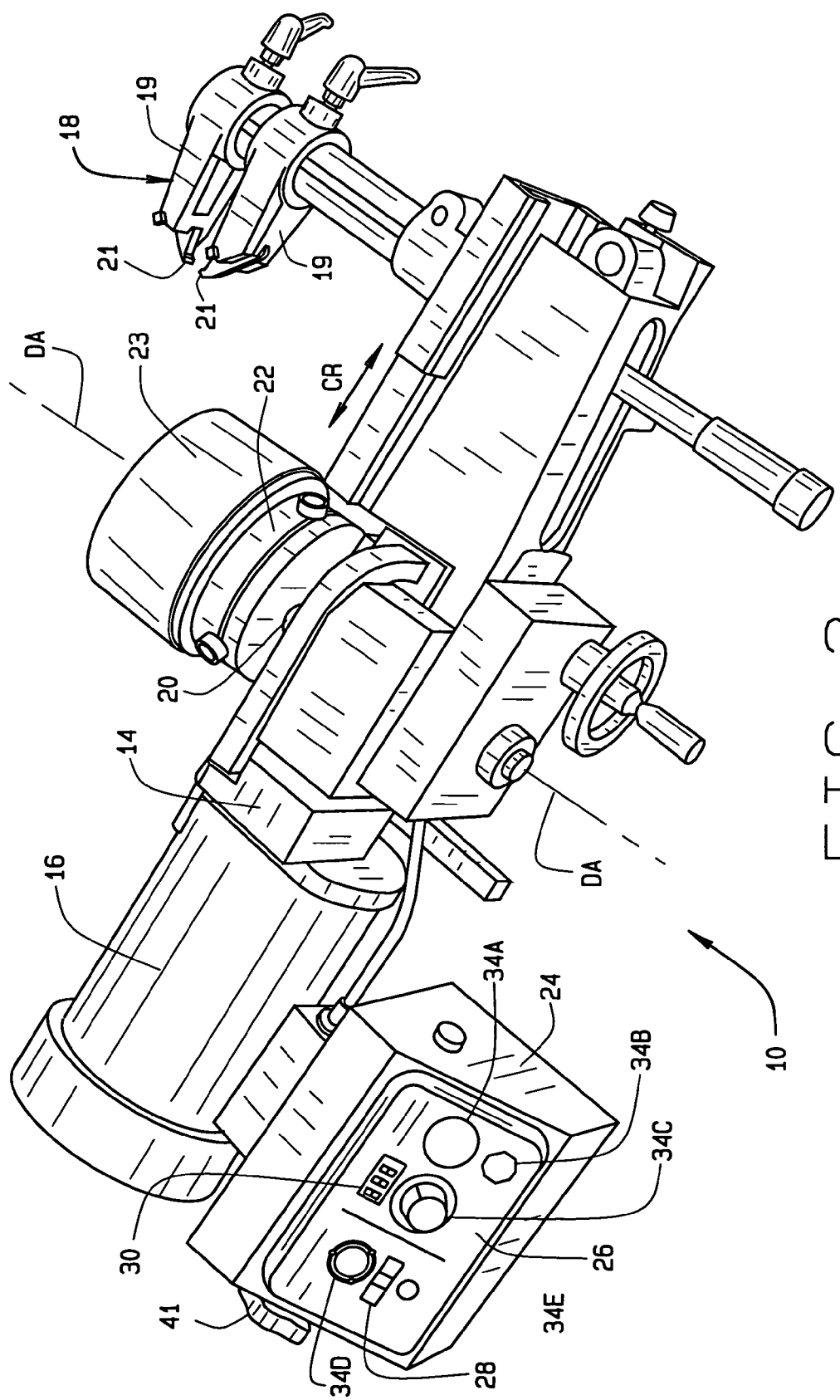
FIG. 2 is a perspective view of the on-car vehicle brake lathe of FIG. 1, without the transport trolley.

Referring to FIGS. 1 and 2, an on-car brake lathe 10 of the present invention is shown mounted to a transport trolley 12 for positioning adjacent a vehicle to be worked on (not shown). The on-car brake lathe 10 includes a support structure 14, onto which is mounted a variable speed drive system. The variable speed drive system preferably includes a variable speed spindle motor 16, an adjustable cutting head 18, and an output spindle 20. The variable speed spindle motor 16 is coupled to the output spindle 20 through a conventional drive mechanism (not shown) contained within the support structure 14, to rotate the output spindle 20 about a drive axis DA, and to linearly feed the cutting head 18 and cutting tool holders 19 carrying cutting tips 21 through a predetermined cutting range CR. An aligning joint 22 is secured to the output spindle 20, concentric with the drive axis DA, adapted to couple the output spindle 20 to a vehicle wheel hub or brake assembly.

Figure 3:
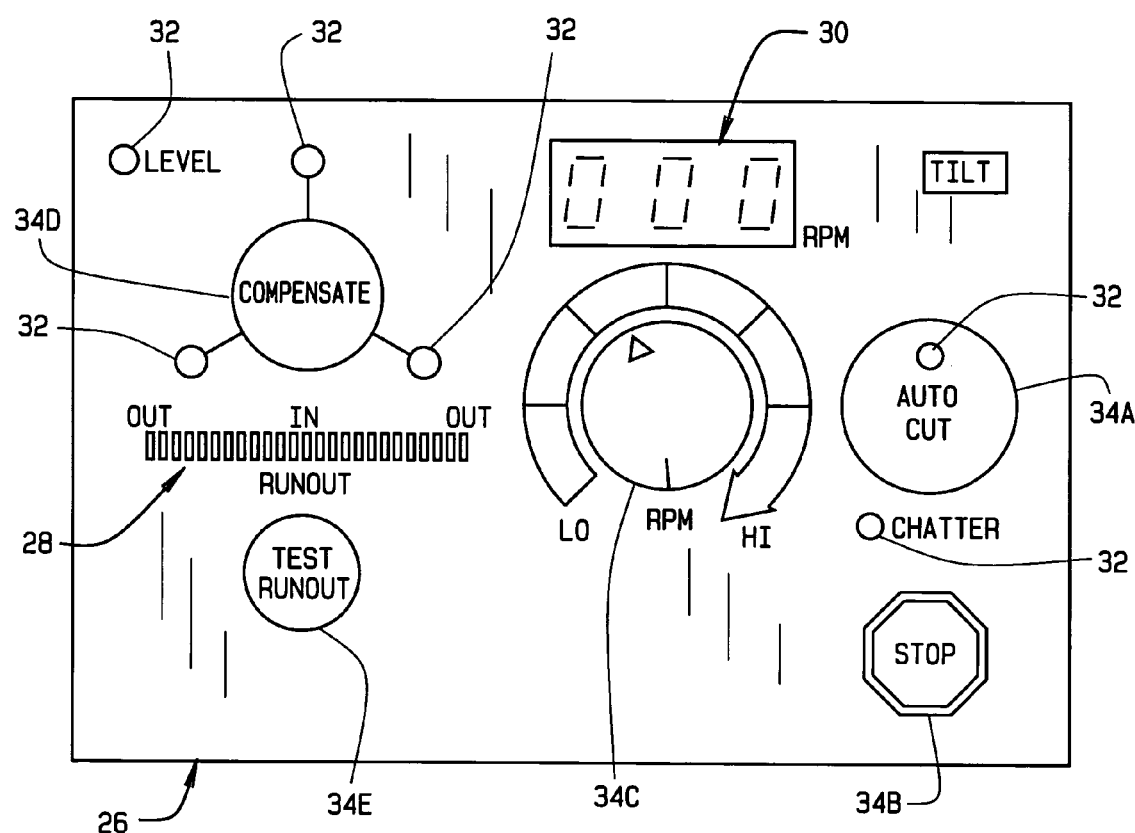
FIG. 3 is a view of the operator interface.

Additionally included on the support structure 14 is an electrical enclosure 24. An operator interface 26 is mounted to the electrical enclosure 24. The operator interface 26, shown in FIG. 3, preferably includes at least a bar graph LED display 28 and a numerical LED display 30, and may optionally include one or more additional visual display elements 32 configured to provide the operator with information associated with the operation of the on-car brake lathe 10. For example, multiple visual display elements 32 in the form of single LED lights may be disposed on the operator interface 26 to assist an operator in performing a runout compensation procedure when coupling the on-car brake lathe 10 with a vehicle brake assembly, or to indicate the presence of a chatter condition during a resurfacing procedure.

Operator input controls 34 are additionally included on the operator interface 26.

The operator input controls 34 preferably include at least a start button 34A, a stop button 34B, a spindle speed control knob 34C, a compensation button 34D, and a runout test button 34E.

Figure 4:
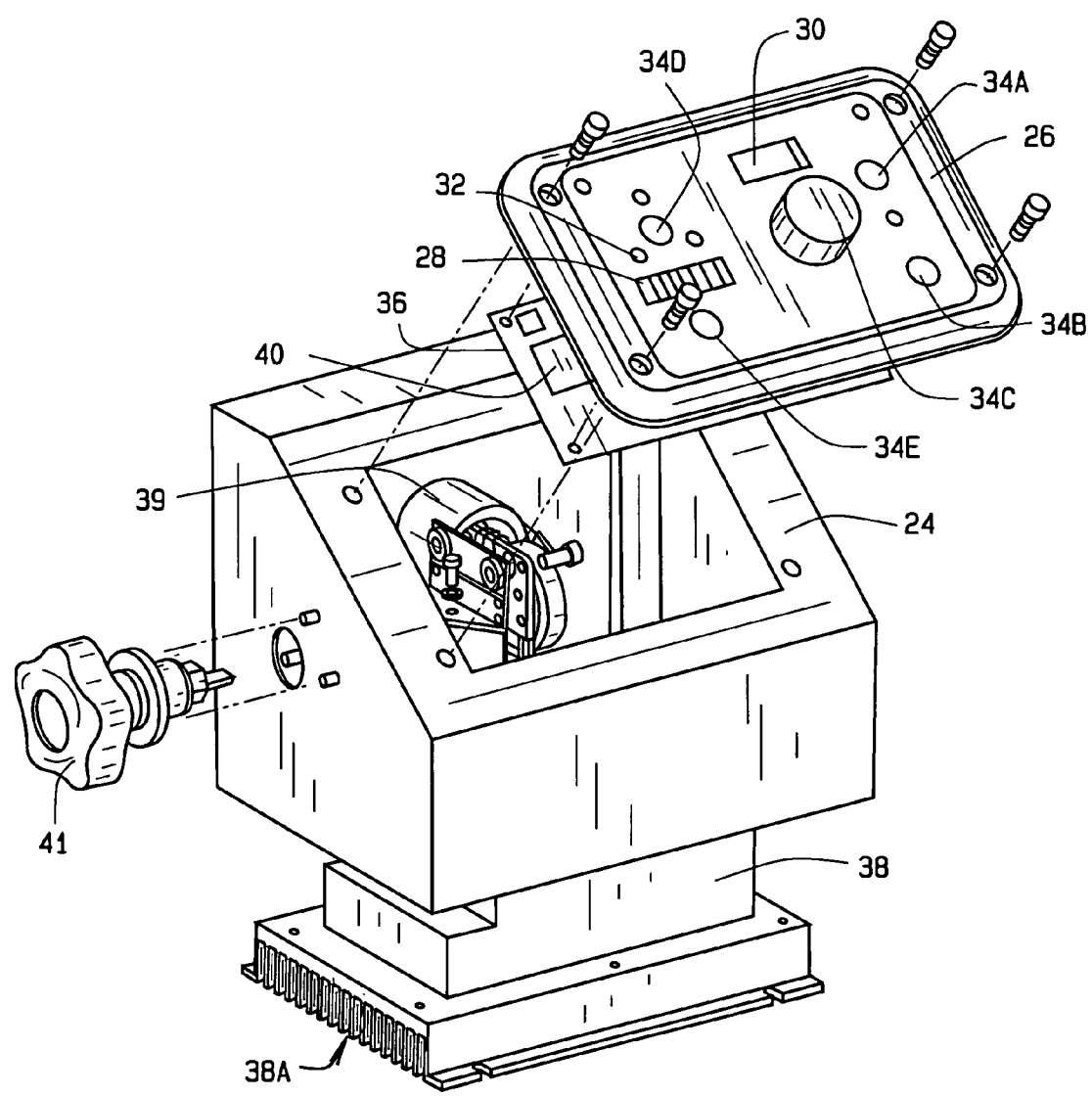
FIG. 4 is an exploded view of the electrical component enclosure.
Figure 5:
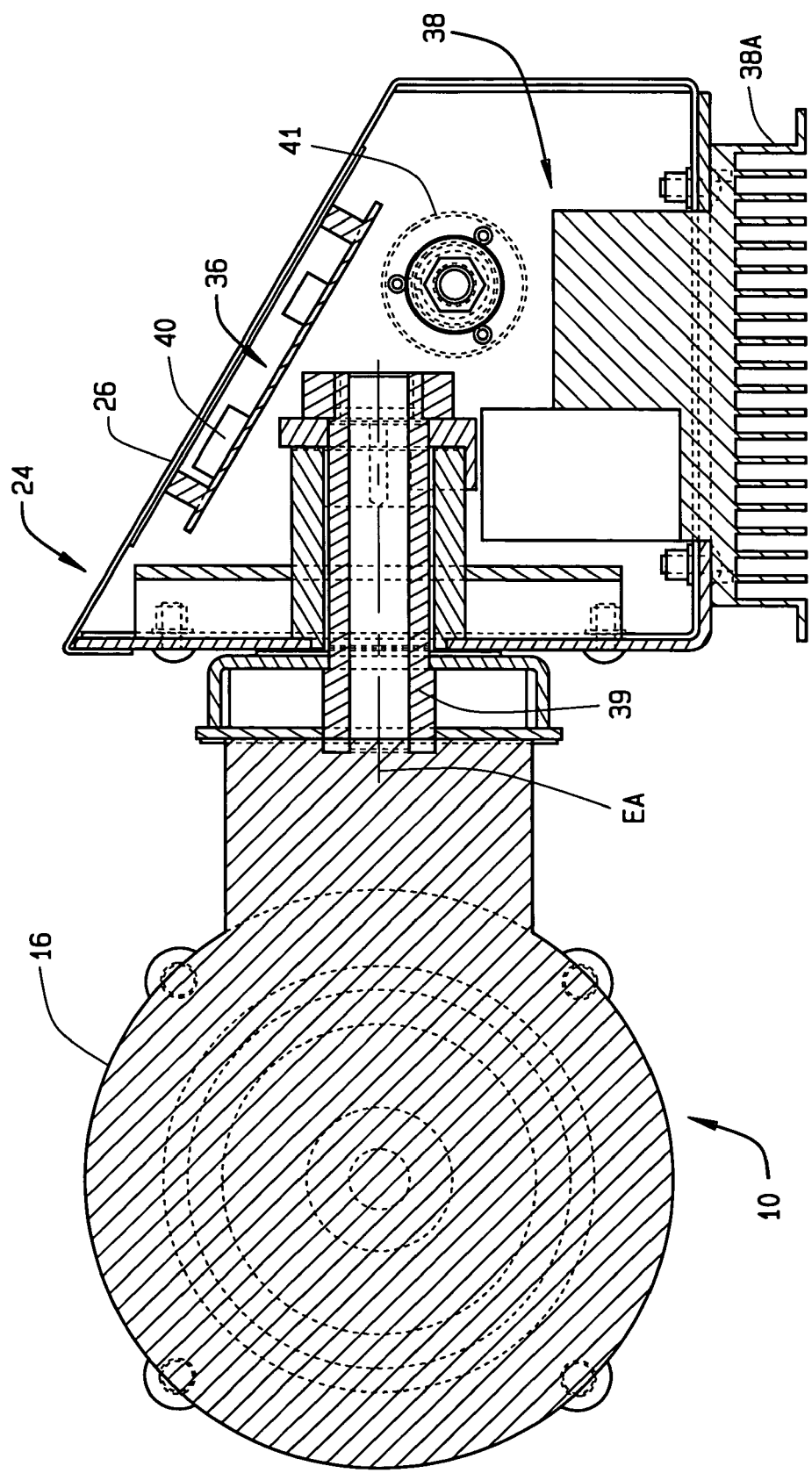
FIG. 5 is a side-sectional view of the electrical component enclosure of FIG. 3.

Included within the electrical enclosure 24, as shown in FIG. 4 and FIG. 5 is a processor board 36 and motor controller 38. The processor board 36 incorporates a microprocessor 40. The microprocessor 40 may be a microcontroller, digital signal processor, or other logic circuit having sufficient capacity to control the functions of the on-car brake lathe 10, and is configured to access and execute instruction sets stored in a suitable electronic memory 40A, such as a RAM, ROM, EPROM, or EEPROM. The electrical enclosure 24 preferably further includes a heat sink 38A associated with the motor controller 38, a mounting shaft 39 for connecting to the on-car brake lathe 10, and an adjustment knob 41.

Figure 6:
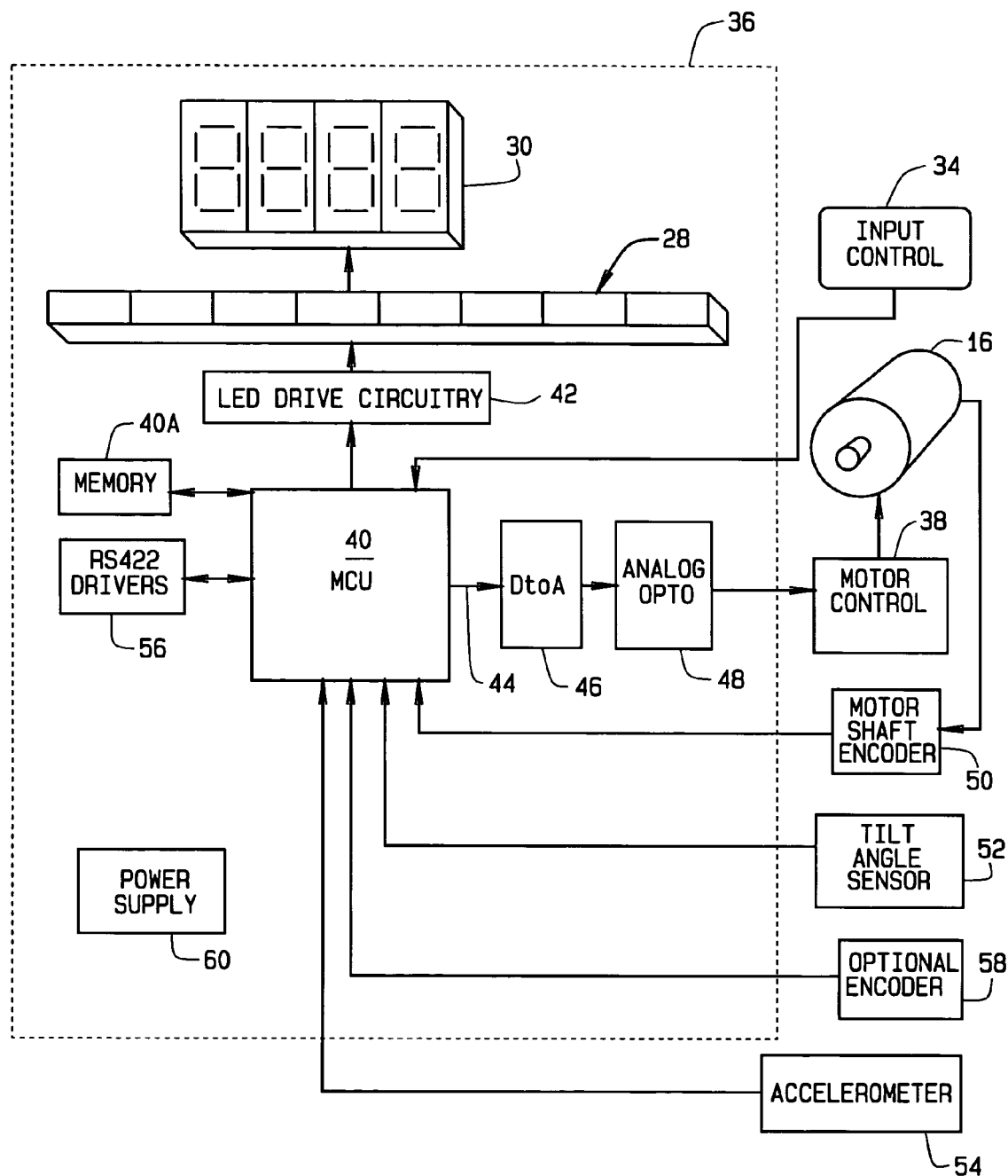
FIG. 6 is a block diagram of the components of the processor board of the on-car brake lathe.

As shown in FIG. 6, the microprocessor 40 is operatively coupled to the motor controller 38 and to an LED drive circuit 42 for controlling the operation of the LED bar graph display 28, LED numeric display 30, and any additional visual display elements 32. The microprocessor 40 is additionally operatively coupled to receive signals from the operator input controls 34. One or more data lines 44 operatively couple the microprocessor 40 to the motor controller 38. The data lines 44 may optionally include a digital to analog converter circuit 46, and/or an analog optical isolator circuit 48, depending upon the particular input requirements of the motor controller 38. The motor controller 38 is in turn, coupled to the variable speed spindle motor 16 to provide electrical power to the motor windings (not shown), thereby controlling the motor output.

As is further seen in FIG. 6, the microprocessor 40 may be operatively coupled to receive input from, or exchange data with, one or more additional components of the on-car brake lathe 10 during operation of the on-car brake lathe 10. These components may include, but are not limited to, a motor shaft rotational position encoder 50, a lathe tilt angle sensor 52, an accelerometer 54, a communications circuit 56 such as an RS422 port, or other optional encoder circuits 58. Preferably, a suitable power supply 60 for the microprocessor 40 and associated circuits, such as a transformer or AC/DC converter, is provided on the processor board 36.

Preferably the microprocessor 40 is configured to monitor the rotational speed of the variable speed spindle motor 16 using the motor shaft rotational position encoder 50, which is operatively coupled to the shaft of the motor engaged with the output spindle 20. A representation of the rotational speed of the motor 16 may be displayed to an operator by the microprocessor 40 using either the LED bar graph display 28 or the LED numeric display 30. The microprocessor 40 regulates the input signal representative of a desired rotational speed to the motor controller 38, and adjusts the input signal in order to reach or maintain a desired rotational speed or torque of the output spindle 20. The output signal of the motor shaft rotational position encoder 50 is further utilized by the microprocessor 40 to monitor and control the rotational position of the output spindle 20 about an arc of less than 360 degrees, such as for use during runout compensation procedures.

In addition to providing control signals to the motor controller 38 in response to signals from the motor shaft rotational position encoder 50, the microprocessor is preferably configured to provide motor speed controls signals in response to signals received from a potentiometer 42 coupled to the spindle speed control knob 34C, permitting an operator to manually indicate or select a desired rotational speed for the motor 16 and/or output spindle 20. A representation of either the actual rotational speed of the motor 16, or the desired rotational speed as indicated by an operator using the spindle speed control knob 34C, may be displayed on either the LED bar graph display 28 or the LED numeric display 30 by the microprocessor 40.

During operation, the on-car brake lathe 10 is detachably secured to a vehicle wheel brake rotor on a vehicle axle in a conventional manner. An adapter (not shown) is initially secured to the vehicle wheel brake rotor using the vehicle wheel lug nuts or retaining bolts (not shown). Next, the on-car brake lathe 10 is moved into position such that the aligning joint 22 and drive axis DA are substantially co-linear with a central axis of the rotor-mounted adapter, corresponding to a rotational axis of the vehicle wheel brake rotor. A threaded retaining shaft (not shown) is passed axially through the support structure 14 and output spindle 20, and engaged with an axial threaded receiving bore (not shown) in the rotor-mounted adapter. Tightening of the threaded retaining shaft seats the rotor-mounted adapter against the aligning joint 26, and secures the on-car brake lathe 10 to the vehicle wheel brake rotor to be resurfaced, enabling the vehicle wheel brake rotor to be rotated by the variable speed spindle motor 16 of the on-car brake lathe 10.

Control of the variable speed spindle motor 16 of the on-car brake lathe 10 to drive the output spindle 20 and the linear movement of the adjustable cutting head 18 is enabled by the microprocessor 40, responsive either to preset instructions or to operator commands received from the operator interface 26, and the motor controller 38. The variable speed spindle motor 16 may be any of a variety of controllable variable speed motors, such as an alternating current (AC) motor with a vector drive or a Volts/Hertz drive control or a direct current motor with a pulse width modulation drive controller or an SCR drive controller. In the preferred embodiment, the variable speed spindle motor 16 is a 3-phase alternating current, 60 Hz, 2 pole induction motor, such as the Franklin Electric Model No. 1313007434, rated at 1.5 horsepower, and the motor controller 38 is a Minarik VFD05-D230-PCM AC Volts/Hz drive controller. In alternate embodiments, the variable speed spindle motor 16 may be a single-phase permanents split capacitor motor, a shaded pole motor, or a synchronous motor.

In the preferred embodiment, the variable speed spindle motor 16 is controlled by the Volts/HZ drive motor controller 38 in response to a 1-10 Volt reference signal conveyed to the motor controller 38 by the microprocessor 40 on the control line 44 coupled between the microprocessor 40 and the motor controller 38. The motor controller 38 varies the output speed of the variable speed spindle motor 16 by altering the frequency of alternating current supplied to the variable speed spindle motor 16 from an external power source. Preferably, the frequency is varied between 40 Hz-80 Hz to achieve a corresponding output speed of the motor 16 between 60-120 RPM. The microprocessor 40 preferably can direct the motor controller 38 to regulate the output speed of the motor 16 to less than 60 RPM, as well as to control the rotation of the motor 16 through less than one complete revolution, as may be required for special operations or runout compensation prior to starting a rotor resurfacing operation.

To maintain a constant flux in the variable speed spindle motor 16, the voltage supplied to the variable speed motor 16 is additionally regulated by the motor controller 38, incrementally increasing at a constant rate from 0 Volts at 0 Hz, to a maximum constant voltage at 60 Hz and above.

In the preferred embodiment, alteration of the frequency of the alternating current supplied to the variable speed spindle motor 16 by the motor controller 38 in response to the reference signal from the microprocessor 40 occurs in three phases. Initially, incoming voltage supplied to motor controller 38 from the external power source is doubled, and supplied alternating current power is converted to direct current power utilizing a bridge rectifier circuit included on the motor controller 38 board. Next, a capacitor circuit also included on the motor controller 38 board is utilized to smooth remaining ripples in the direct current power left over from the alternating current sine wave patterns. Finally, the motor controller 38 utilizes an inverter circuit to provide pulse width modulation to recreate an alternating current sine wave at the desired frequency and voltage from the direct power waveform. Those of ordinary skill in the art will recognize that the bridge rectifier circuit, capacitor circuit, and inverter circuit are of conventional design, and hence are not specifically illustrated in the Figures.

The frequency of the pulse width modulations is varied in response to the reference voltage from the microprocessor 40, utilizing a plurality of transistor circuits, thereby supplying a variable voltage to the variable speed spindle motor 16. Thus, alternating current having a voltage and frequency regulated by the motor controller 40 is supplied to the variable speed spindle motor 16. The rotational speed and torque of the variable speed spindle motor 16 is correspondingly proportional to the supplied alternating current voltage and frequency.

In an alternate embodiment, the variable speed spindle motor 16 of the on-car brake lathe 10 is a pulse-width-modulation (PWM) controlled direct current motor. A 30 Hz watchdog pulse is supplied to the motor controller 38 from the microprocessor 40, together with a signal representative of a settable duty cycle, which is interpreted by the motor controller 38 as a linear function of the desired "torque", such as shown in U.S. Pat. No. 6,324,908 to Colarelli, III et al. and in U.S. Pat. No. 6,386,031 to Colarelli, et. al. for vehicle wheel balancer applications. The motor controller 38 is configured to regulate the output speed and torque of the variable speed spindle motor 16 by controlling the flow of direct current to the motor windings from an external power source.

Figure 7:
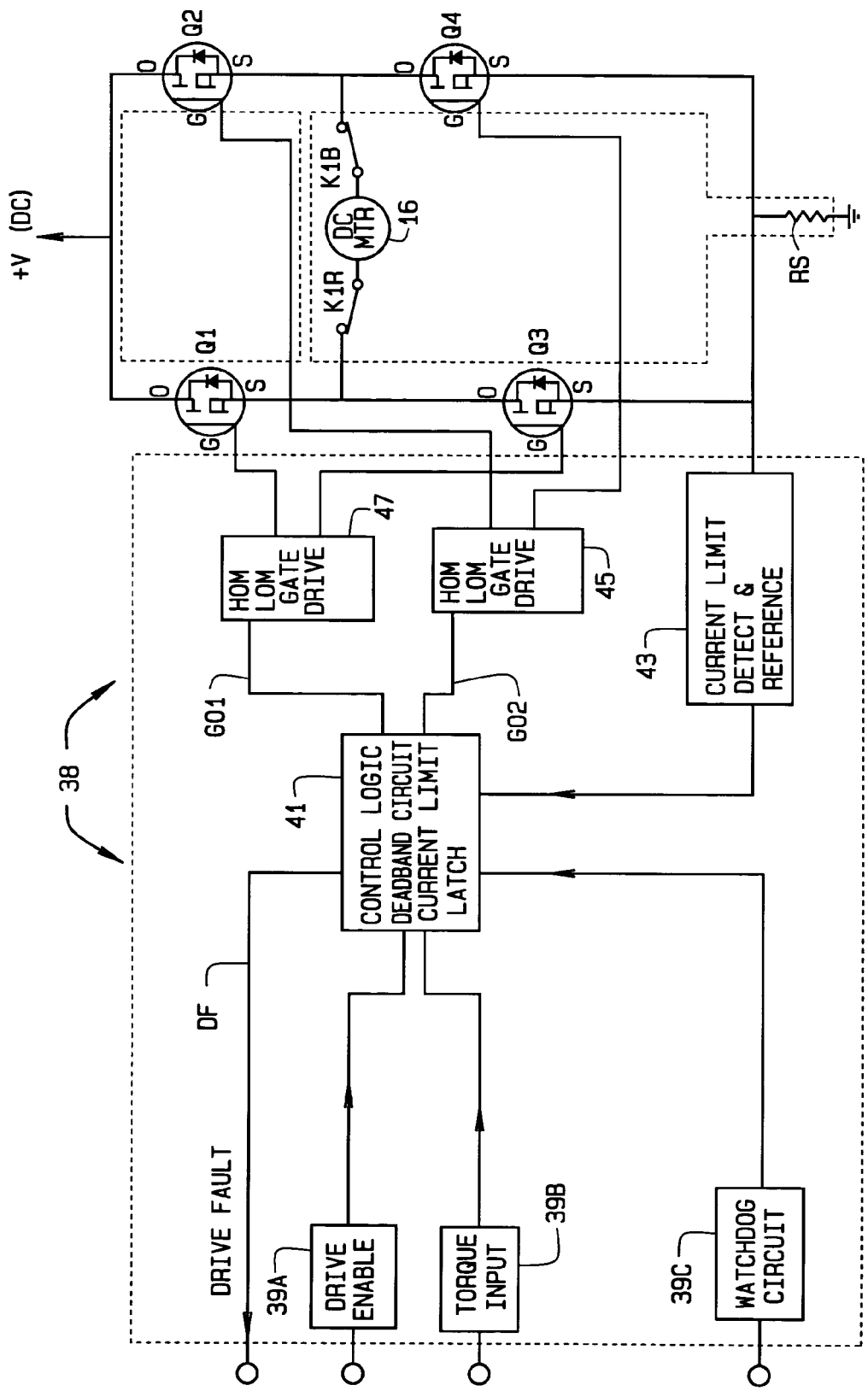
FIG. 7 is a block diagram of motor control circuitry of the on-car brake lathe.

For example, as shown in FIG. 7, the motor controller 38 may include a set of four drive transistors Q1, Q2, Q3, and Q4 connected to provide direct current to the windings of the variable speed spindle motor 16 selectively with each polarity. Specifically, a first transistor Q1 is connected to supply direct current from a bridge rectifier circuit receiving alternating current from an external power source to one side of the windings of the variable speed spindle motor 16. When a flow of direct current is supplied through the first transistor Q1 to the windings, the circuit is completed through the windings and a second transistor Q4 to an electrical ground. This causes the windings of the variable speed spindle motor 16 to be energized so as to cause rotation of the drive shaft in a first rotational direction. Similarly, when the first two transistors Q1 and Q4 are rendered non-conductive, and the second two transistors Q2 and Q3 are conducting direct current, the windings of the variable speed spindle motor 16 are energized with the opposite polarity, resulting in rotation in a second direction. It is preferred that the direction of rotation of the variable speed spindle motor 16 be controlled by the pulse width modulation of the direct current to the transistors. A duty cycle of 50% causes the direct current to flow through the motor windings in both directions in equal amounts. By providing a suitably high pulse rate, the motor 16 has insufficient time to respond to the rapidly reversing currents, resulting in zero motor rotational velocity. Under these conditions, the motor 16 actively holds the output shaft in a current rotational position, providing, in effect, a "detent" function for the output spindle 20.

A duty cycle of less than 50% causes rotation of the motor 16 and output spindle 20 in a first direction. As the duty cycle decreases from 50%, the torque in the direction of rotation increases. Similarly, a duty cycle of more than 50% causes rotation of the motor 16 and output spindle 20 in the second direction. As the duty cycle increases from 50%, the torque in the direction of rotation increases. A 0% duty cycle achieves maximum torque in a first rotational direction, while a 100% duty cycle achieves maximum torque in the second rotational direction.

Whatever variable speed drive system is used with a variable speed drive motor 16, it preferably has interface circuits 39A, 39B, and 39C for the drive enable, "torque" input, and watchdog inputs respectively from the microprocessor 40. These signals are supplied to a control logic circuit 41 which performs necessary logic functions, as well as conventional deadband, and current limit functions. Circuits to perform the functions of logic circuit 41 are well known. The current limit function of logic circuit 41 depends upon the current measured by the current sense resistor RS, the voltage across which is detected by a current limit detection and reference circuit 43.

Logic circuit 41 has three outputs. The first, a drive fault line DF, is used to signals the microprocessor 40 that a drive fault has occurred. The second and third, labeled GD1 and GD2, supply pulse width modulated control signals to the actual gate drive circuits 45 and 47, circuit 45 being connected to the gates of transistors Q2 and Q4.

In alternate embodiments, it is possible to achieve a desired variable speed spindle motor torque settings using a varying analog level, a frequency modulated digital signal, or other approaches, depending upon the input requirements of the variable speed spindle motor 16.

Those of ordinary skill will recognize that a variety of benefits and improvements to on-car brake lathes may be achieved through the incorporation of a variable speed spindle motor 16 and the associated control components of the present invention. For example, the microprocessor 40 may be configured with software instructions to direct the motor controller 38 to drive the variable speed spindle motor 16 at a variable speed during a vehicle brake resurfacing operation, achieving greater efficiency and resurfacing consistency. Alternatively, the microprocessor 40 may be configured with software instructions to direct the motor controller 38 to drive the variable speed spindle motor 16 at one or more sustained speeds during a vehicle brake resurfacing operation, depending upon the particular procedure for which the on-car brake lathe is being utilized, or in response to a characteristic of the vehicle brake rotor. Preferably, the variable or sustained speeds at which the motor 16 is driven include any speed less than or equal to the rated speed of the motor 16.

Utilizing signals received from the motor shaft encoder 50, the microprocessor 40 may optionally be configured to identify the initial amount of torque exerted by the variable speed spindle motor 16 to initiate rotation of the output spindle 20 when the on-car brake lathe 10 is coupled to a vehicle brake assembly. This initial amount of torque is associated with a set of parameters identifying the particular input power requirements of the motor 16 to achieve the identified torque, which are temporarily stored by the microprocessor 40 in an electronic memory. The microprocessor 40 may be configured to subsequently utilize the stored power parameters to provide the motor controller 38 with a starting point for enabling rotation of the motor 16, without requiring the motor controller 38 to "ramp up" from an minimum power level prior to achieving rotation of the motor 16.

Those of ordinary skill in the art will recognize that a number of the inventive features of the present invention may be implemented in an on-car brake lathe through the incorporation of a fixed-speed motor coupled to a mechanical transmission having at least two discrete speeds in place of the variable speed spindle motor 16. Selective engagement of discrete drive ratios within the mechanical transmission may achieve two or more discrete rotational speeds of the output spindle 20, providing for multiple cutting speeds and linear feed rates.

The present invention can be embodied in-part in the form of computer-implemented processes and apparatuses for practicing those processes. The present invention can also be embodied in-part in the form of computer program code containing instructions embodied in tangible media, such as floppy diskettes, CD-ROMs, hard drives, or an other computer readable storage medium, wherein, when the computer program code is loaded into, and executed by, an electronic device such as a computer, micro-processor or logic circuit, the device becomes an apparatus for practicing the invention.

The present invention can also be embodied in-part in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented in a general-purpose microprocessor, the computer program code segments configure the microprocessor to create specific logic circuits.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

The invention claimed is:

1. A on-car brake lathe system for resurfacing a brake disk of a vehicle brake assembly coupled to a vehicle axle, the brake lathe system having a support structure, an adjustable cutting head secured to the support structure, and an output spindle secured to the support structure and rotationally driven about a drive axis, comprising:
   a variable speed drive system secured to said support structure, said variable speed drive system having a variable speed spindle motor operatively coupled to said output spindle to rotationally drive said output spindle about the drive axis at a selected variable drive speed; and
   wherein said variable speed spindle motor is further configured to drive said adjustable cutting head at a selected variable feed rate.

2. The on-car brake lathe system of claim 1 wherein said variable speed drive system is a direct current motor.

3. The on-car brake lathe system of claim 2 wherein said variable speed drive system is configured with a pulse width modulation motor controller.

4. The on-car brake lathe system of claim 2 wherein said variable speed drive system is configured with an SOR motor controller.

5. The on-car brake lathe system of claim 1 wherein said variable speed drive system is an alternating current motor.

6. The on-car brake lathe system of claim 5 wherein said variable speed drive system is configured with a vector drive motor controller.

7. The on-car brake lathe system of claim 5 wherein said variable speed drive system is configured with a motor controller having an inverter circuit.

8. The on-car brake lathe system of claim 5 wherein said variable speed drive system is configured with a Volts/Hertz drive motor controller.

9. The on-car brake lathe system of claim 8 wherein said variable drive speed is less than 120 RPM.

10. The on-car brake lathe system of claim 1 wherein said output spindle variable speed is selected from a plurality of predetermined speeds.

11. The on-car brake lathe system of claim 10 wherein at least one of said plurality of predetermined speeds is less than 60 RPM.

12. The on-car brake lathe system of claim 1 further including a manual input signal representing a desired speed of rotation of the output spindle, said variable speed drive system being responsive thereto to alter said variable drive speed to cause the output spindle to rotate at said desired speed of rotation.

13. The on-car brake lathe system of claim 12 further including a display of the desired speed.

14. The on-car brake lathe system of claim 12 wherein the variable speed drive system is responsive to a manual input signal to rotate the output spindle at a rotational speed substantially less than the full speed of said variable speed drive system.

15. The on-car brake lathe system of claim 1 wherein the variable speed drive system includes an electric motor.

16. The on-car brake lathe system of claim 1 wherein the variable speed drive system includes a transmission having at least two discrete output speeds.

17. A on-car brake lathe system for resurfacing a brake disk of a vehicle brake assembly, the brake lathe system having a support structure, an adjustable cutting head secured to the support structure, and an output spindle secured to the support structure and rotationally driven about a drive axis, further comprising:
 a variable speed spindle motor secured to said support structure and operatively coupled independently drive each of said output spindle and said adjustable cutting head;
 a motor controller operatively coupled to said variable speed spindle motor; and
 wherein said motor controller is configured to control said variable speed spindle motor to selectively drive said output spindle at a variable drive speed and to selectively drive said adjustable cutting head at a variable feed rate.

18. The on-car brake lathe system of claim 17 wherein said motor controller is operatively coupled to a microprocessor, said motor controller configured to control said variable speed spindle motor responsive to at least one signal from said microprocessor.

19. The on-car brake lathe system of claim 17 wherein said motor controller is configured to stop rotation of the variable speed spindle motor in response to one or more predetermined conditions.

20. The on-car brake lathe system of claim 17 where said motor controller is configured to control rotational movement of said variable speed spindle motor through a rotational arc of less than 360 degrees.

21. The on-car brake lathe system of claim 17 where said motor controller is configured to control rotational movement of said variable speed spindle motor to selectively position said output spindle at one or more rotational positions.

22. The on-car brake lathe system of claim 18 wherein said microprocessor is configured responsive to a vehicle brake assembly having a parameter greater than a predetermined threshold, to cause said motor controller to regulate the output spindle to rotate at less than a first selected drive speed.

23. The on-car brake lathe system of claim 22 wherein said microprocessor is further configured responsive to said parameter not exceeding said predetermined threshold, to cause said motor controller to regulate the output spindle to rotate at a second selected drive speed, the first selected drive speed being lower than the second selected drive speed.

24. The on-car brake lathe system of claim 18 further including at least one input device for providing at least one speed selection signal indicative of a desired speed to said microprocessor; said microprocessor responsive to said at least one speed selection signal to signal said motor controller to drive the output spindle at a drive speed corresponding to said desired speed.

25. The on-car brake lathe system of claim 18 wherein said microprocessor is configured to determine the torque required to achieve rotation of the output spindle during a first application of power to said variable speed spindle motor.

26. The on-car brake lathe of claim 25 wherein said microprocessor is further configured to store said required torque, and to establish said stored torque as a starting torque for subsequent applications of power.

27. The on-car brake lathe system of claim 1 wherein said variable speed spindle motor is further configured to selectively drive said output spindle about the drive axis in a rotational direction selected from between a first rotational direction and a second rotational direction which is opposite from said first rotational direction.

28. The on-car brake lathe system of claim 17 wherein said motor controller is further configured to control said variable speed spindle motor to selectively drive said output spindle in a selected rotational direction at said variable drive speed, said rotational direction selected from between a first rotational direction and a second rotational direction which is opposite from said first rotational direction.

* * * * *

UNITED STATES PATENT AND TRADEMARK OFFICE
CERTIFICATE OF CORRECTION

| | | |
|---|---|---|
| PATENT NO. | : 7,334,510 B2 | |
| APPLICATION NO. | : 10/898115 | |
| DATED | : February 26, 2008 | |
| INVENTOR(S) | : Michael D. Gerdes et al. | |

It is certified that error appears in the above-identified patent and that said Letters Patent is hereby corrected as shown below:

In Claim 4 at Col. 8, Line 63

Replace "SOR"
    with --SCR--

Signed and Sealed this

Twelfth Day of August, 2008

JON W. DUDAS
*Director of the United States Patent and Trademark Office*